May 22, 1934. B. G. HOWELL ET AL 1,959,826
PIPE COUPLING
Filed June 21, 1933
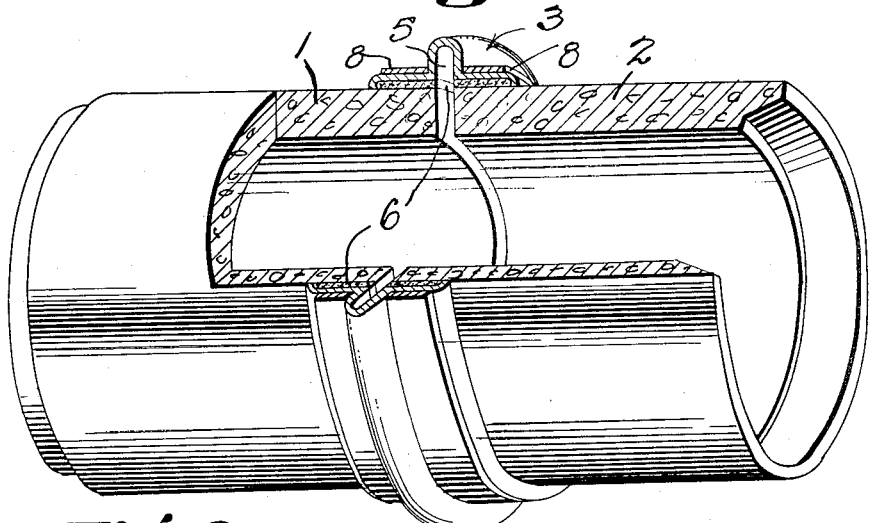
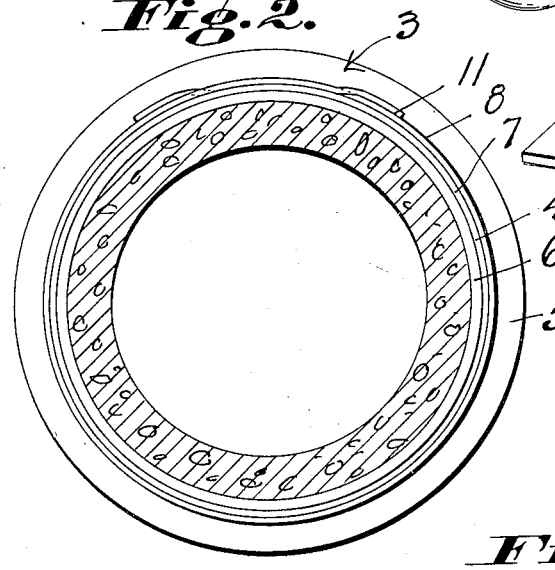
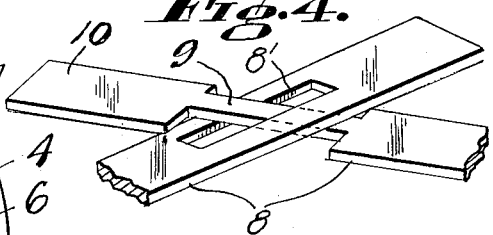
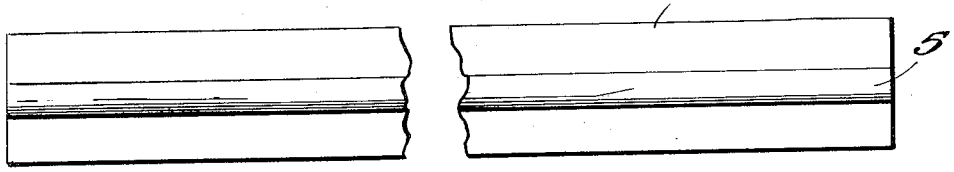
INVENTORS
B. G. HOWELL
I. F. STONE
BY
ATTORNEYS.

Patented May 22, 1934

1,959,826

UNITED STATES PATENT OFFICE 1,959,826

PIPE COUPLING

Bruce Gordon Howell, Harlingen, Tex., and Ira F. Stone, Arlington, Va.

Application June 21, 1933, Serial No. 676,944

1 Claim. (Cl. 285—90)

This invention has reference generally to improvements in pipe couplings and more particularly relates to a flexible pipe joint.

It is the primary aim and object of the invention to provide an improved pipe joint for flexibly connecting the adjacent ends of molded pipe sections together, to provide for expansion and contraction due to temperature changes, the parts being arranged so that they can be readily applied being particularly adapted for application to existing pipe lines for quickly replacing worn or damaged joints without disconnecting the pipe sections.

Another object of the present invention resides in the provision of improved clamping bands for fastening the ends of the sleeve which is provided with an expansion zone to the respective pipe ends.

As a further object the invention contemplates the provision of a sleeve formed from a sheet of flexible metal and having an expansion zone, the sheet being wrapped about the layer of mortar on the adjacent pipe ends with the ends of the sheet secured together as by soldering so as to form the sleeve.

Other objects as well as the nature characteristic features and scope of the invention will be more readily apparent from the following description taken in connection with the accompanying drawing and pointed out in the claim forming a part of this specification.

The invention is clearly illustrated in the accompanying drawing, in which:—

Fig. 1 is a perspective view partly in section to illustrate the constructional details of the joint in position on the abutting ends of a pair of pipe sections, Fig. 2 is a transverse sectional view thereof, Fig. 3 is an extended top plan view of the sheet forming the sleeve, and Fig. 4 is a perspective detail of one of the clamping bands the parts being in a preliminary engaged position.

Similar characters of reference are employed in all of the above described views to indicate corresponding parts.

Referring now, more particularly to the accompanying drawing, there is provided a pair of molded cementitious pipe ends 1 and 2 which are preferably though not necessarily of the type used in forming lengthy conduits in the midwestern districts of this country while arranged about said pipe ends is the improved flexible joint generally designated by the numeral 3.

In reducing the invention to practice there is employed a rectangular sheet 4 of flexible metal such as lead having an expansion zone 5 in the form of a groove extending throughout its length and medially of its edges. After a layer of mortar 6 or the like is applied about the ends 1 and 2 the sheet is wrapped about the layer of mortar and its ends fastened together as by soldering, for instance at the point 7 thereby forming a sleeve.

In order to finally secure the sleeve in position clamping bands 8 are arranged about the ends of the sleeve. In practice it has been found desirable to utilize bands of the type shown in Fig. 4 which are formed of strap metal, one end portion being slotted as at 8 while the other end portion is reduced to leave a restricted portion 9 and providing a head 10 which is inserted at an inclination through the slot 8 and subsequently straightened when the reduced portion is engaged in the slot. The end portions of the bands after the preliminary engagement has been effected are gripped in suitable gripping appliances and pulled taut whereupon the end portions are soldered as at 11 to the main portions thereby tightly fastening the sleeve in the position shown in Fig. 1.

It is believed to be apparent that the present joint can be easily and quickly applied and is especially adapted for use in repairing and replacing worn and damaged joints in existing pipe lines without necessitating any serious inconvenience.

It is also believed that in view of the foregoing description that a further detailed description is entirely unnecessary. Likewise it is believed that the advantages of the invention will be readily apparent.

Having thus fully described the invention what is claimed and desired to be secured by Letters Patent is:

Means for joining the abutting ends of molded pipes to provide for expansion and contraction due to temperature changes comprising a flexible metallic sheet, having an expansion zone therein adapted to be disposed about the pipe ends with the ends of the sheet secured together to form a sleeve, a layer of cementitious material interposed between the pipe ends and the sleeve, flexible bands disposed about the ends of the sleeve beyond the expansion zone, and means to secure said bands about said sleeve ends.

BRUCE GORDON HOWELL.
IRA F. STONE.